United States Patent
Berstis

(10) Patent No.: US 7,171,616 B1
(45) Date of Patent: Jan. 30, 2007

(54) METHOD, SYSTEM AND COMPUTER PROGRAM PRODUCT FOR KEEPING FILES CURRENT

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 09/406,435

(22) Filed: Sep. 27, 1999

(51) Int. Cl.
*G06F 15/00* (2006.01)

(52) U.S. Cl. ...................... 715/511; 717/170
(58) Field of Classification Search ............. 715/511; 717/170, 122
See application file for complete search history.

(56) References Cited

U.S. PATENT DOCUMENTS

| | | | |
|---|---|---|---|
| 5,388,255 A | 2/1995 | Pytlik et al. ............. 395/600 |
| 5,764,992 A * | 6/1998 | Kullick et al. ............ 717/170 |
| 5,832,520 A * | 11/1998 | Miller ..................... 707/203 |
| 5,845,077 A | 12/1998 | Fawcett |
| 5,899,998 A | 5/1999 | McGauley et al. ......... 707/104 |
| 5,911,071 A | 6/1999 | Jordan .................... 395/701 |
| 6,006,206 A * | 12/1999 | Smith et al. ............... 705/35 |
| 6,185,584 B1 * | 2/2001 | Paik et al. ................ 715/511 |
| 2001/0007147 A1 * | 7/2001 | Goldschmidt et al. ....... 717/11 |
| 2002/0120648 A1 * | 8/2002 | Ball et al. ................. 707/511 |

FOREIGN PATENT DOCUMENTS

| | | |
|---|---|---|
| GB | 2333864 | 8/1999 |
| WO | WO 00/73901 A1 | 12/2000 |

OTHER PUBLICATIONS

Johnson, Chris., "Simple Internet Version Control (SIVC) Protocol," University of Texas, Dec. 21, 1995, pp. 1-11.

* cited by examiner

*Primary Examiner*—Heather R. Herndon
*Assistant Examiner*—R. Singh
(74) *Attorney, Agent, or Firm*—David A. Mims, Jr.; Dillon & Yudell LLP

(57) ABSTRACT

A method, system and computer program product for keeping files current for use in a computer system coupled to a network. The method includes: (1) evaluating a downloaded file from a source within the network to determine if a source identifier is present in the downloaded file, (2) checking the source periodically using the source identifier to determine if a newer version of the downloaded file exists and (3) replacing, in response to the presence of a newer version of the downloaded file, the downloaded file with the newer version. The method further includes attaching, in response to the source identifier not being present, a source descriptor to the downloaded file.

30 Claims, 3 Drawing Sheets

METHOD, SYSTEM AND COMPUTER PROGRAM PRODUCT FOR KEEPING FILES CURRENT

BACKGROUND OF THE INVENTION

1. Field of the Invention

The present invention relates generally to data processing and in particular to file management. Still more particularly, the present invention relates to a method, system and computer program product for keeping files current.

2. Description of Related Art

"Network computing" in a literal sense means an environment wherein a number of computers and/or peripheral devices are connected together by a communication medium (whether it be a wired or wireless medium). Additionally, the term "network" also means a communication network for transmitting data between devices that are connected to the network, such as computers, printers, storage devices and the like. There are diverse forms of networks that range from a local area type, such as a local area network (LAN), to a wide area type such as a public switched telephone network (PSTN) and further to the "Internet" that has grown to a large collection of global networks as a result of interconnecting respective servers.

A LAN is a smallest unit of a network, which is autonomously operated/managed by an independent organization, such as a college or research institution to cover a relatively narrow area, e.g., a single campus or the like. Supported with the price reduction of communication equipment reflecting the evolution of semiconductor technologies and the enhanced functions of communication software, LANs have been primarily used in areas, such as in the research/development arenas, for the purpose of sharing computer resources, sharing/distribution of information and the like.

Wide area networks (WANs), on the other hand, are, in a simplistic sense, a larger collection of LANs wherein the servers that service each individual LAN are interconnected to create a larger network environment. Thus the services, e.g., sharing/distribution of information, are made available on a much larger global arena.

The emergence of wide area network systems, such as the Internet, has increased the accessibility of information. Connected users within these network systems have access to useful information that is made publicly available from locations, or sites, such as research facilities and libraries. These publicly available information are typically downloaded by a user, e.g., in the form of ZIP and PDF files, that are then saved on the user's memory storage devices, e.g., hard disk drive and writeable CDROM.

The files that have been downloaded may typically reside in the user's memory devices for extended periods of time prior to the information contained in those files being accessed by the user. During this extended period of time, which may be months or years, the information may become outdated or updates may exist that correct errors that have been identified in the version of the file that was downloaded. Furthermore, with the passage of time, the user may not remember the location from where the file originated and determining that location may be a difficult, if not impossible, task if the user decides to check for an updated or newer version.

SUMMARY OF THE INVENTION

It is therefore an object of the present invention to provide a method, system and computer program product for keeping files within a data processing system current.

To achieve the foregoing object, and in accordance with the invention as embodied and broadly described herein, a method, system and computer program product are disclosed for keeping files current for use in a computer system coupled to a network. The method includes: (1) evaluating a downloaded file from a source within the network to determine if a source identifier is present in the downloaded file, (2) checking the source periodically utilizing the source identifier to determine if a newer version of the downloaded file exists and (3) replacing, in response to the presence of a newer version of the downloaded file, the downloaded file with the newer version. The method further includes attaching, in response to the source identifier not being present, a source descriptor to the downloaded file.

In one embodiment of the present invention, the step of replacing the downloaded file includes the steps of (1) providing an indication to a user that the newer version of the file exists, (2) prompting the user to replace the downloaded file with the newer version and (3) replacing, in response to the user requesting the newer version, the downloaded file with the newer version.

In another embodiment of the present invention, the source identifier is located in the extended attribute of the downloaded file. It should be noted, however, that the location of the source identifier may vary depending on the type of file format or operating system employed.

In yet another embodiment of the present invention, the downloaded file is a PDF file. Alternatively, in another advantageous embodiment, the downloaded file is a ZIP file. It should be readily apparent to those skilled in the art that the present invention may be advantageously practiced with other file format methodologies.

In another embodiment of the present invention, the step of checking the source periodically includes defining a time interval. In one advantageous embodiment, the time interval is user defined. Alternatively, the step of checking the source may be accomplished whenever the downloaded file is opened or "on-demand" by a user.

In one embodiment of the present invention, the network is a packet network. Of course, the present invention may also be advantageously practiced in other network environments such as local area networks (LANs) and wide area networks (WANs). The present invention does not contemplate limiting its use to any one particular network environment.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DESCRIPTION OF THE ILLUSTRATIVE EMBODIMENTS

Figure 1:
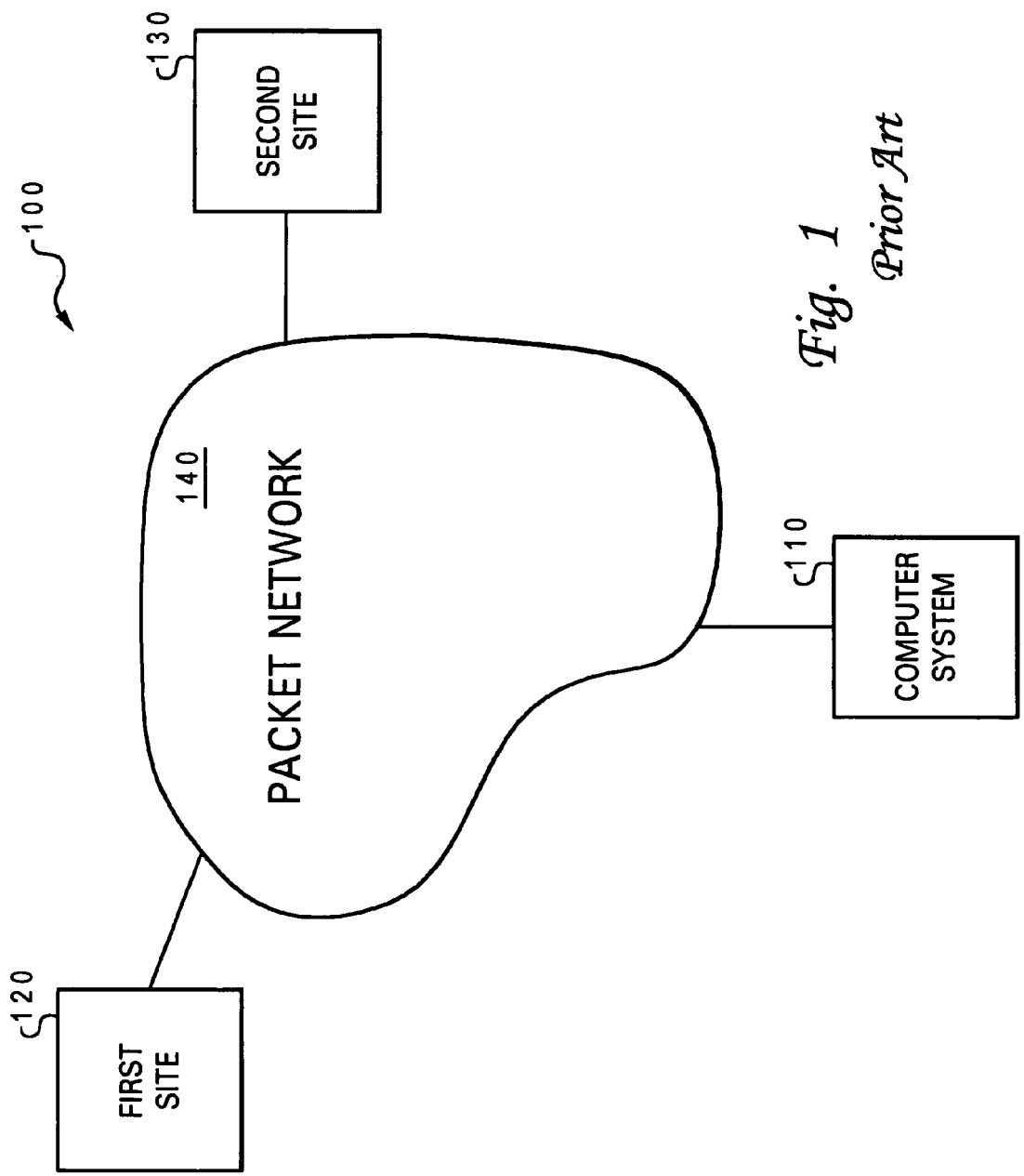
FIG. 1 illustrates an exemplary network system that provides a suitable environment for the practice of the present invention.

With reference now to the figures, and in particular, with reference to FIG. 1, there is depicted an exemplary network system 100 that provides a suitable environment for the practice of the present invention. Network system 100 includes a computer system 110, such as a personal computer (PC), that is coupled to first and second sites 120, 130, respectively, via a packet network 140, e.g. the Internet. It should be noted that the present invention may also be advantageously practiced in other network environments, such as a local area network (LAN). First and second sites 120, 130 are generally sites that provide information to users, such as libraries and research facilities, that are connected to network system 100. First and second sites 120, 130 typically provide services, which may be free, i.e., no monetary charges are required to access the site services, that include application programs, such as Acrobat reader from Adobe. These "free" programs are generally available in a file that a user, such as computer system 110, would download through packet network 140 to a memory device (not shown), such as a hard disk or a writeable CDROM, coupled to computer 110.

As discussed previously, the files that have been downloaded may typically reside in the user's memory devices for extended periods of time prior to the information contained in those files being accessed by the user. During this extended period of time, which may be months or years, the information may become out dated or updates may exist that correct errors that have been identified in the version of the file that was downloaded. Furthermore, with the passage of time, the user may not remember the location from where the file originated and determining that location may be a difficult, if not impossible, task if the user decides to check for a updated or newer version.

Figure 2:
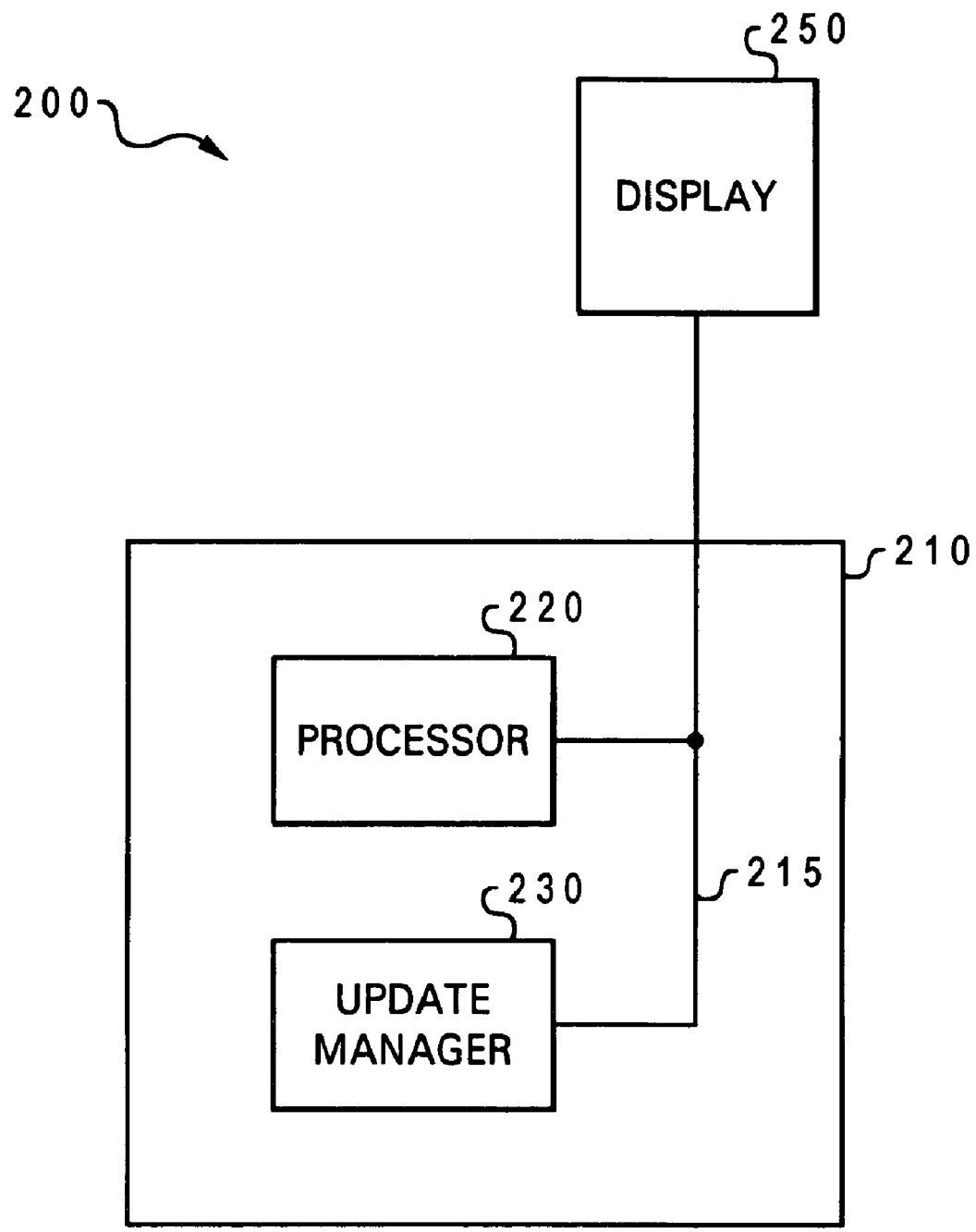
FIG. 2 illustrates an embodiment of a controller employing a file updating system constructed utilizing the principles disclosed by the present invention.

Referring now to FIG. 2, there is illustrated an embodiment of a controller 200 employing a file updating system constructed utilizing the principles disclosed by the present invention. Controller 200 (analogous to computer system 100 illustrated in FIG. 1), in an advantageous embodiment, is a personal computer manufactured by IBM Corporation of Armonk, N.Y. It should also be readily apparent to those skilled in the art, however, that alternative computer system architectures may be employed. Generally, controller 210, embodied in a PC computer, comprises a bus 215 for communicating information, a processor 220 coupled to bus 215 for processing information, a random access memory (not shown) coupled to bus 215 for storing information and instructions for processor 220, a read-only memory (not shown) coupled to bus 215 for storing static information and instructions for processor 220, a display device 250 coupled to bus 215 for displaying information for a computer user, an input device (not shown) coupled to bus 215 for communicating information and command selections to processor 220 and a data storage device (not shown), such as a magnetic disk and associated disk drive, coupled to bus 215 for storing information and instructions.

Processor 220 may be any of a wide variety of general purpose processors or microprocessors, such as the i486™ or Pentium™ brand microprocessor manufactured by Intel Corporation of Santa Clara, Calif. However, it should be apparent to those skilled in the art that other varieties of processors may be utilized in a computer system. Display device 250 may be a liquid crystal device, cathode ray tube (CRT), or other suitable display device. The data storage device may be a conventional hard disk drive, floppy disk drive, or other magnetic or optical data storage device for reading and writing information stored on a hard disk drive, floppy disk drive, or other magnetic or optical data storage medium.

In general, processor 220 retrieves processing instructions and data from a data storage medium using the data storage device and downloads this information into random access memory for execution. Thereafter, processor 220 then executes an instruction stream from random access memory or read only memory. Command selections and information input at the input device are used to direct the flow of instructions executed by processor 220. The results of this processing execution are then displayed on display device 250.

Controller 210 further includes an update manager 230 that is coupled to processor 220. Update manager 230, in an advantageous embodiment, is embodied as a set of computer executable instructions stored on a computer readable medium, such as the hard disk. It should be readily apparent, however, to those skilled in the art that update manager 230 may also be implemented in hardware, firmware, software and any combination thereof. The present invention does not contemplate limiting its practice to any particular form of implementation.

Figure 3:
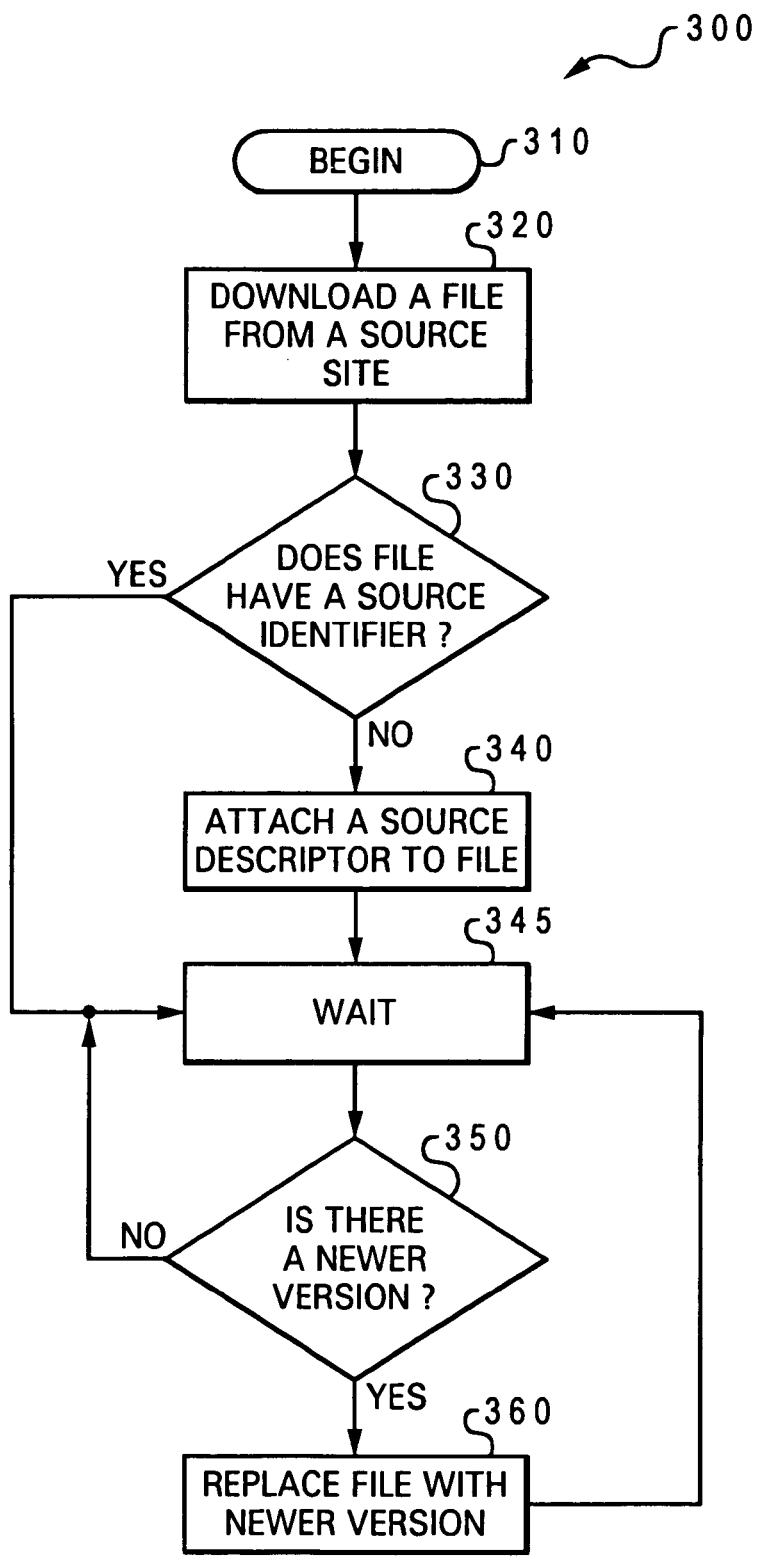
FIG. 3 illustrates a high level logic flow diagram of an embodiment of a file updating process utilizing the principles disclosed by the present invention.

Referring now to FIG. 3, with continuing reference to FIGS. 1 and 2, depicted is a high level logic flow diagram of an embodiment of a file updating process 300 utilizing the principles disclosed by the present invention. Process 300 begins, as depicted in step 310, when the process is queued for execution. Next, as illustrated in step 320, controller 210 selects and downloads a file from a source site, e.g., first or second sites 120, 130. In an advantageous embodiment, the downloaded file may be a PDF file. Alternatively, in another advantageous embodiment, the downloaded file is a ZIP file. It should be noted, however, that the practice of the present invention is not limited to any particular type of file format methodology.

Following the downloading of the selected file, update manager 230 evaluates the downloaded file to determine if the file has a source identifier associated with the site from which it was obtained, as depicted in decisional step 330. The evaluation is accomplished, e.g., by looking at the extended attributes or directory in the downloaded file, to see if an identifier, such as an uniform resource locator (URL), associated with the site is present. If it is determined that there is no source identifier associated with the downloaded file, update manager attaches a source descriptor to the downloaded file, as illustrated in step 340. The attachment or "tagging" the source descriptor may be accomplished, e.g., by adding a new comment entry in a ZIP file. Generally, most relevant file formats have room for additional comment text or other attribute string. This attribute string, i.e., "source identifier," is added to the file to identify the source location of the file to which it is attached or in which it appears. It should be noted that certain operating systems, such as OS/2, support extended attributes that are associated with a file. Therefore, the source identifier may be stored as an extended attribute and does not need to be inserted inside the file. The source identifier, in an advantageous embodiment, may contain the following:

(1) A signature string that is unlikely to appear in any other portion of the file. This signature string is used to find the source identifier within the file.

(2) A URL or other locator string that identifies the location from which the file (its newest version) can be retrieved.

(3) A date/time and version number corresponding to the file.

(4) A checksum string covering the prior entries to make it less likely that random data content would be mistaken for a signature string.

When the source identifier is located within the file, it should be also located as far towards the end of the file as possible, so that the last signature string in the file is the one that is a part of the source identifier. In the event that an uncompressed archive file, such as a ZIP file, contains other ZIP files with their own source identifiers, locating the source identifier at the end of the file would prevent the present invention from incorrectly using an earlier embedded source identifier in the file. It should be readily apparent to those skilled in the art that the preferred location of the source identifier is different for different file types and depends on the methodology employed by the file to contain comment strings.

Alternatively, in another advantageous embodiment, an entry may be entered in a specially coded file registry associated within controller 210 that records, at a minimum, the name of the downloaded files and a source descriptor identifying the originating source, such as an URL, from where the downloaded file was obtained. Other entries in this file registry may include a time stamp of when the downloaded file was retrieved from the source site. In the case where controller 210 is running an OS/2 operating system, the source descriptor information may be stored in the extended attributes of the downloaded file. It should be readily apparent to those skilled in the art that the location where the source descriptor is stored is dependent on the file format methodology employed by controller 210, e.g., for a PDF file, the source descriptor information may not be added to the file in a manner that may disable older versions of Acrobat viewers. In the case of a PDF file or with the OS/2 operating system discussed above, in an advantageous embodiment, the source descriptor could be stored within the file by replacing a text of a comment or any other embedded string in the document file with a specially coded string that has an unique digital signature.

Following the attachment of the source descriptor, process 300 enters a "dormant" or waiting period, as depicted in step 345, until such time as when the downloaded file is opened by a user or, in another advantageous embodiment, at a predetermined time interval. The time interval is typically set by the user and may be programmed to be as short as daily or longer as every six months. Alternatively, in another embodiment, a triggering event may be an "on-demand" request by the user to update the file. Similarly, if it is determined in step 330 that the downloaded file has a source identifier included in it, process 300 proceeds to wait until the downloaded file is opened by the user or at the predetermined time interval.

In the event that the downloaded file is opened by the user, or in another alternative embodiment, at the expiration of the predetermined time interval, update manager 230 retrieves the source identifier from the downloaded file and proceeds to check the file's source site to determine if a newer version of the file is present, as depicted in decisional step 350.

If there is a newer version of the file present, the update manager 210 proceeds to provide an indication to the user that a newer version of the file is available. The user may be prompted with a message, such as "Updated version of file available, would you like to replace existing file Y/N" displayed on display 250. If the user responses with an affirmative Y, update manager 230 replaces the "older" file with its newer or updated version as illustrated in step 260. Alternatively, in another embodiment, replacing the older file involves renaming the older file. With this approach, the older version of the file is still available along with the newer, i.e., most current, file version. After update manager has replace the file with its newer version or if the user had decided that the newer version is not desired, process 300 does nothing and returns to its dormant state, i.e., step 345, to wait for the next triggering event, e.g., when the file is opened again, on-demand by the user or at the end of the next time interval.

The present invention provides for the automatic updating of files that have been downloaded from a source site that is coupled to a user's system without the user having to remember where the file was obtained from. Consequently, with an attached source identifier, any downloaded file can be traced to its originating source site. Furthermore, mirror sites can perform automatic file updates based on the file content rather than using a separate directory of file locations.

It should be noted that although the present invention has been described in the context of a computer system, those skilled in the art will readily appreciate that the present invention is also capable of being distributed as a computer program product in a variety of forms; the present invention does not contemplate limiting its practice to any particular type of signal-bearing media, i.e., computer readable medium, utilized to actually carry out the distribution. Examples of signal-bearing media includes recordable type media, such as floppy disks and hard disk drives, and transmission type media such as digital and analog communication links.

In a preferred embodiment, the present invention is implemented in a computer system programmed to execute the method described herein. Accordingly, in an advantageous embodiment, sets of instructions for executing the method disclosed herein are resident in RAM of one or more of computer systems configured generally as described hereinabove. Until required by the computer system, the set of instructions may be stored as computer program product in another computer memory, e.g., a disk drive. In another advantageous embodiment, the computer program product may also be stored at another computer and transmitted to a user's computer system by an internal or external communication network, e.g., LAN or WAN, respectively.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for keeping files current for use in a client computer system coupled to a network, the method comprising the steps of:
    evaluating at said client a downloaded file from a source within said network to determine if a source identifier is present in said downloaded file, wherein said downloaded file is stored at said client with a signature string utilized to find said source identifier within said file and one or more identifying parameters from among: (1) a locator string identifying a network location from which the file is sourced; (2) a date/time and version number of said file; and (3) a checksum string covering prior entries of said file;
    dynamically checking said source periodically utilizing said source identifier to determine if a newer version of said downloaded file exists; and
    replacing said downloaded file at said client with a complete copy of said newer version when said newer version of said newer version of said download file exists at said source.

2. The method as recited in claim 1 wherein said step of evaluating further includes the step of attaching, when no source identifier is present, a source identifier to said downloaded file at said client that indicates the network location from which the downloaded file is obtained.

3. The method as recited in claim 1 wherein said step of replacing said downloaded file includes the steps of:
    providing an indication to a user that said newer version of said file exists;
    prompting said user, prior to initiating a download of the newer version, to select whether to replace said downloaded file with said newer version; and
    when said user selects to replace the downloaded file with said newer version, initiating said replacing of said newer version, of said downloaded file by downloading a complete copy of said newer version in place of a present version, wherein when said user does not request said newer version, the present version of said downloaded file on said client is not replaced with the newer version, and the newer version is not downloaded.

4. The method as recited in claim 1 wherein said source identifier is located in the extended attribute of said downloaded file.

5. The method as recited in claim 1 wherein said source identifier is a uniform resource locator (URL).

6. The method as recited in claim 1 wherein said step of checking said source periodically includes:
    defining a default, automatic time interval at which said checking step is initiated; and
    enabling a user of said client to adjust said time interval, if desired.

7. The method as recited in claim 1, wherein said replacing step further comprises:
    renaming a previously stored copy of said downloaded file on said client system from a current working name to an archived name; and
    storing said newer version of said downloaded file with the current working name of the downloaded file.

8. The method as recited in claim 1 wherein said step of checking said source comprises checking said source responsive to a request to open/access said downloaded file, wherein, when said checking step is preset to be automatically initiated at a defined periodic time interval, said method further comprises overriding a current time interval by initiating said checking step at the time of receipt of the request to open/access said downloaded file and restarting a current time interval.

9. The method as recited in claim 1, further comprising storing an identifier and a source descriptor of said downloaded file and each newer version of said downloaded file in a specially coded file registry, which is checked by a controller for correct file location during said checking step.

10. The method as recited in claim 1 wherein said network is a packet network.

11. A computer system operating in a network environment, comprising:
    a processor;
    a storage device;
    an update manager executing within said processor, including:
        means for evaluating a downloaded file from a source within said network to determine if a source identifier is present in said downloaded file, wherein said downloaded file is stored in said storage device with a signature string, different from a name string of the file and utilized to identity said source identifier with said file and one or more identifying parameters from among: (1) a locator string identifying a network location from which the file is sourced; 2 a date/time and version number of said file; and 3 a checksum string covering prior entries of said file;
        means for checking said source periodically utilizing said source identifier to determine if a newer version of said downloaded file exists; and
        means for replacing said downloaded file at said client with a complete copy of said newer version when the newer version of said downloaded file is present at the source.

12. The computer system as recited in claim 11 wherein said means for evaluating further includes means for attaching, in response to no source identifier being present, a source identifier to said downloaded file at said client.

13. The computer system as recited in claim 11 wherein said means for replacing said downloaded file includes:
    means for providing an indication to a user that said newer version of said file exists;
    means for prompting said user, prior to initiating a download of the newer version, to replace said downloaded file with said newer version; and
    means, when said user selects to replace the downloaded file with said newer version, for initiating said replacing of said downloaded file by downloading a complete copy of said newer version in place of a present version wherein when said user does not request said newer version, the present version of said downloaded file on said client is not replaced with the newer version, and the newer version is not downloaded.

14. The computer system as recited in claim 11 wherein said source identifier is located in the extended attribute of said downloaded file.

15. The computer system as recited in claim 11 wherein said source identifier is a uniform resource locator (URL).

16. The computer system as recited in claim 11 wherein said means for checking said source periodically includes:
    means for defining a default, automatic time interval at which said checking step is initiated; and
    means for enabling a user to adjust said time interval, if desired.

17. The computer system as recited in claim 16 wherein said replacing means further comprises:
    means for renaming a previously stored copy of said downloaded file on said client system from a current working name to an archived name; and
    means for storing said newer version of said downloaded file with the current working name of the downloaded file.

18. The computer system as recited in claim 11 wherein said means for checking said source comprises checking said source responsive to a request to open/access said downloaded file, wherein, when said checking is preset to be automatically initiated at a defined periodic time interval, said system further comprises means for overriding a current time interval by initiating said checking whenever the request to open/access said downloaded file is received and restarting a current time interval.

19. The computer system as recited in claim 11, further comprising means for storing an identifier and a source descriptor of said downloaded file and each newer version of said downloaded file in a specially coded file registry, which is checked by a controller for correct file location during said checking step.

20. The computer system as recited in claim 11 wherein said network is a packet network and said computer system is a client system coupled to said network.

21. A computer program product comprising:
    a computer-readable medium having stored thereon computer executable instructions for implementing a method for keeping files current for use in a client computer system coupled to a network, said computer executable instructions when executed, perform the steps of:
        evaluating at said client a downloaded file from a source within said network to determine if a source identifier is present in said downloaded file, wherein said downloaded file is stored at said client with a name string and a signature string, different from the name string and utilized to identify said source identifier within said file and one or more identifying parameters from among: (1) a locator string identify a network location from which the file is sourced; (2) a date/time and version number of said file; and (3) a checksum string covering prior entries of said file;
        dynamically checking said source periodically utilizing said source identifier to determine if a newer version of said downloaded file exists; and
        replacing said downloaded file at said client with a complete copy of said newer version when said newer version of said downloaded file exists at said source.

22. The computer program product as recited in claim 21 wherein said step of evaluating further includes the step of attaching, in response to no source identifier being present, a source identifier to said downloaded file at said client.

23. The computer program product as recited in claim 21 wherein said step of replacing said downloaded file includes the steps of:
    providing an indication to a user that said newer version of said file exists;
    prompting said user, prior to initiating a download of the newer version, to replace said downloaded file with said newer version; and
    when said user selects to replace the downloaded file with said newer version, initiating said replacing of said downloaded file by downloading a complete copy of said newer version in place of a present version, wherein when said user does not request said newer version, the present version of said downloaded file on said client is not replaced with the newer version, and the newer version is not downloaded.

24. The computer program product as recited in claim 21 wherein said source identifier is located in the extended attribute of said downloaded file.

25. The computer program product as recited in claim 21 wherein said source identifier is a uniform resource locator (URL).

26. The computer program product as recited in claim 21 wherein said step of checking said source periodically includes:
    defining a default, automatic time interval at which said checking step is initiated; and
    enabling a user to adjust said time interval, if desired.

27. The computer program product as recited in claim 26 wherein said replacing step further comprises:
    renaming a previously stored copy of said downloaded file on said client system from a current working name to an archived name; and
    storing said newer version of said downloaded file with the current working name of the downloaded file.

28. The computer program product as recited in claim 21 wherein said step of checking said URL comprises checking said source responsive to a request to open/access said downloaded file, wherein, when said checking step is preset to be automatically initiated at a defined periodic time interval, said method further comprises overriding a current time interval by initiating said checking step at the time of receipt of the request to open/access said downloaded file and restarting a current time interval.

29. The computer program product as recited in claim 21, further comprising storing an identifier and a source descriptor of said downloaded file and each newer version of said downloaded file in a specially coded file registry, which is checked by a controller for correct file location during said checking step.

30. The computer program product as recited in claim 21 wherein said network is a packet network.

* * * * *